INVENTOR
H. J. WHITE
BY
R. C. Winter
ATTORNEY

Nov. 10, 1970 H. J. WHITE 3,539,933

SWITCHOVER LOGIC CIRCUIT

Filed Sept. 7, 1967 3 Sheets-Sheet 2

United States Patent Office 3,539,933

Patented Nov. 10, 1970

3,539,933
SWITCHOVER LOGIC CIRCUIT
Herbert J. White, Narberth, Pa., assignor to Bell Telephone Laboratories, Incorporated, Murray Hill and Berkeley Heights, N.J., a corporation of New York
Filed Sept. 7, 1967, Ser. No. 666,109
Int. Cl. H03k *17/00*
U.S. Cl. 328—154 10 Claims

ABSTRACT OF THE DISCLOSURE

In an electronic clock, one of two crystal controlled signal sources operating independently at the same frequency drives a pair of pulse pattern generators. A logic circuit, comprising a binary counter, is described which permits switching between the two signal sources without a momentary increase in pulse rate of the pulse pattern generators.

BACKGROUND OF THE INVENTION

This invention relates to signal generator arrangements and, more particularly, to means for providing and maintaining reliable operation of equipment utilizing signal generator arrangements such as pulse timing control circuits.

A large number of electronic digital systems including data processors, computers, and electronic telephone systems employ clocking arrangements to accurately control the rate at which digital signals are transferred between the various portions of such systems. These clocking means may comprise a source of well defined and accurately timed pulses which drive a pulse sequence generator to provide a predetermined pulse pattern. Pulses from the pulse sequence generator can then be distributed to a plurality of switching and logic devices in accordance with the overall design of the system.

Malfunctions and component failures in the individual sections of the system including the clock can cause total system failure and various methods have been devised to insure reliable operation. The duplication of sections of digital systems is one method used to minimize the effects of such malfunctions. Where duplicated equipment is used, it is desirable to periodically perform maintenance tests on both the regularly used and the duplicate sections. This procedure insures proper operation of the duplicated sections. In some priorly known systems, however, it is necessary to disrupt system operation in the event that a previously unused portion of the equipment is put into service. But, in other types of equipment, e.g., electronic telephone systems and real time data processors, uninterrupted service is required. Thus, detection and correction of circuit troubles and device failures must be accomplished while the system continues in active service.

In electronic telephone equipment, it is impossible to disrupt a large number of calls for maintenance tests. When it is necessary to switch between duplicated clocks, an interruption in the clock pulse pattern that effectively increases the rate of device switching in the system beyond device capability cannot be tolerated. Switching between clocks must be done without an increase in clock rate or any other change than can cause interruption in service. This problem is further aggravated if duplicated clocks operating independently of each other are used. In that case, switching between clocks even if done at the designed clock rate can cause a momentary disruption of the clock pulse pattern. This is so because phase differences between the duplicated clocks at the time of switchover may result in a transient increase in repetition rate or a shortening of an individual clock pulse. Even a single disruption can cause complete failure in the operation of a real time system since erroneous signals so generated can create further errors. A momentary decrease in clock rate compatible with continuous service may be tolerable but a momentary increase in the clock pulse rate beyond the capability of the electronic devices in the system during switchover from one clock to another is particularly troublesome.

BRIEF SUMMARY OF THE INVENTION

This invention is a logic circuit which couples signals from one of first and second independently operating signal sources to a pulse generator. The switching circuit permits uninterrupted switching between the first and second source with no momentary increase in the pulse rate of the generator due to the phase difference between the sources. A momentary increase is prevented by delaying the application of second source signals for one-half cycle of the second source frequency after inhibition of first source signals. In accordance with one embodiment of this invention, pulses from a first source are applied to the set input of a binary counter to inhibit passage of negative-going pulses from a second source to a pulse sequence generator. After switchover to the second pulse source, the first source pulses are prevented from setting the binary counter and second source pulses are applied to the toggle input thereof. Detection of the first positive transition in pulses from the second source in the absence of first source pulses reverses the state of the binary counter so that second source pulses cannot be applied to the pulse sequence generator until the positive-going portion of one second source pulse is completed. This delay prior to the application of pulses from the second source to the pulse sequence generator prevents a transient increase in the pulse rate of the pulse sequence generator. The first positive transition also generates a signal which inhibits application of further second source pulses to the toggle input of the binary counter.

DETAILED DESCRIPTION

General description of clock circuit

Figure 1:
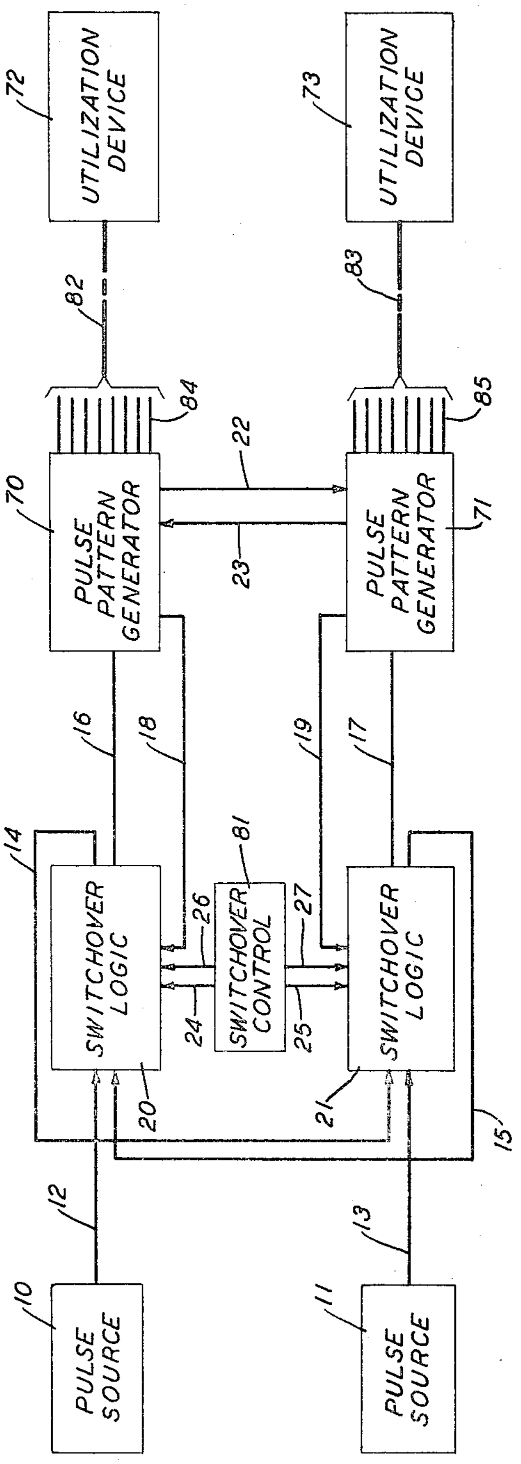
FIG. 1 is a block diagram of a clock circuit which includes a switchover logic arrangement in accordance with this invention.
Figure 4:
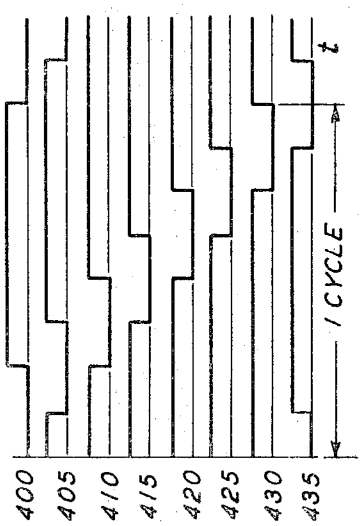
FIG. 4 illustrates pulse pattern waveforms generated in a clock utilizing the hereinbefore mentioned embodiment of this invention.

This invention is described in the context of an electronic telephone system such as disclosed in M. E. Alterman et al. Ser. No. 414,365, filed Nov. 27, 1964, wherein portions of the control section of the system are duplicated to insure uninterrupted service. FIG. 1 shows a clock circuit which generates repetitive pulse patterns that may be used to control the timing of digital signals in this type of electronic telephone arrangement. Referring to FIG. 1, utilization devices 72 and 73 represent duplicated sections of an electronic telephone control system to which the clock pulse sequence of FIG. 4 is applied. Devices 72 and 73 operate simultaneously and in parallel so that each device receives identically timed clock pulses. While there is simultaneous operation, only one utilization device is "on line," that is, only one device is in service and controls telephone connections. In case of failure of the operating utilization device or the need for maintenance tests, the "off line" device may be put "on line" without interruption of service to customers. This is so because both utilization devices operate in parallel.

Pulse sources 10 and 11 are identical and both produce well defined and accurately timed repetitive pulses which pulses are used to generate clock pulse patterns. Pulse source 10 applies pulses to switchover logic 20 via lead 12 while pulse source 11 applies pulses to switchover logic 21 via lead 13. In the embodiment of the switchover logic hereinafter described, it is assumed that sources 10 and 11 are crystal controlled and operate independently of each other at the same frequency. Because they operate independently, phase differences between the pulse trains from sources 10 and 11 almost always occur. But utilization devices 72 and 73 must operate in parallel and in synchronism. Therefore, only one pulse source can be used to provide the needed clock pulse pattern for both utilization devices 72 and 73. If two pulse sources are used, the aforementioned phase differences cause utilization devices 72 and 73 to operate out of synchronism. In that event the "off line" device may contain different control information than the "on line" device and consequently the "off line" device cannot be put into service without disrupting system operation.

Either pulse source 10 or pulse source 11 may be used to control the clocking of utilization devices 72 and 73 via pulse pattern generators 70 and 71. The pulse source so used is "on line" and the duplicated pulse source is "off line." Thus, if pulse source 10 is "on line," pulses therefrom are applied to swtichover logic 20. During normal operation, switchover logic 20 permits aplication of these pulses to pulse generator 70 via lead 16. An identical pulse train from source 10 is applied through lead 14 to switchover logic 21 and therefrom via lead 17 to pattern generator 71. In this manner, phase differences between the signals from generators 70 and 71 are avoided.

The sequence of signals on cables 82 and 83 from pulse generators 70 and 71 are determined by the nature of the utilization devices driven thereby. In the hereinafter described embodiment, the multiphase pattern of FIG. 4 is assumed to drive appropriately selected electronic switches in utilization devices 72 and 73. Pulse pattern generators 70 and 71 may comprise shift registers arranged to geneate the pattern illustrated in FIG. 4 in response to the periodic pulse train from one of pulse sources 10 and 11. Pulse pattern generators 70 and 71 are interconnected through leads 22 and 23 which leads permit synchronizing signals to be exchanged therebetween. If pulse source 10 and pulse generator 70 are "on line," synchronizing pulses are transmitted via lead 22 to pattern generator 71. Alternatively, if pattern generator 71 is "on line," synchronizing pulses are sent therefrom to pattern generator 70 via lead 23. In this way identical operation of both utilization devices is assured.

In the embodiment of this invention hereinafter described, switchover is not permitted to disrupt the cycle of clock pulses illustrated in FIG. 4. To prevent such disruption, signals are transmitted via leads 18 and 19 from generators 70 and 71 to their respective switchover logic circuits. These signals allow an "off line" to "on line" switchover only at the end of the pulse sequence in progress after a switchover command is given. Switchover commands are generated in switchover control 81 and transmitted to switchover logic 20 via leads 24 and 26 and to switchover logic 21 via leads 25 and 27.

If, as previously assumed, pulse source 10 is "on line," switchover command signals applied to switchover logic 20 and 21 inhibit pulses from source 11 from being applied to leads 17 and 15 and permit pulses from lead 12 to be applied to pattern generator 70 via lead 17 and to pattern generator 71 via lead 14, switchover logic 21, and lead 17. Differences in phase between the pulse trains of pulse sources 10 and 11 at the time of switchover can instantaneously generate an individual clock pulse that is narrower than the design of the utilization devices permits. Also, clock pulse waveforms may appear during switchover in which the overlap period between two adjacent pulses is shortened.

Both these deviations in clock patern appear at the connected utilization devices as a transient increase in clock rate. This increase may exceed the capabilities of switching devices in utilization devices 72 and 73. Errors in system operation can then occur which in all probability will be further propagated and cause disruption of service. In order to avoid this momentary increase in clock rate, the switchover logic is designed to delay the application of pulses from the pulse source going "on line," in this case pulse source 11, thereby causing a transient decrease in clock rate which can be tolerated because it is not sufficiently long to disrupt service.

After switchover is completed through use of the switchover logic in accordance with this invention, pulse source 11 applies pulses via leads 16 and 17 to both pulse generators 70 and 71 so that utilization devices 72 and 73 operate in phase with respect to one another although the pulses therefrom are independent of the signal from source 10. Switchover from source 11 to source 10 is accomplished in a similar manner using switchover logic 20 to delay the application of pulses from source 10 after the inhibition of pulses from source 11 to prevent the hereinbefore mentioned transient increase in clock rate. The switchover between pulse sources in accordance with this invention may be utilized to permit testing of the "off line" sections of the system or to permit repair of degraded or faulty components in the equipment placed "off line." In this manner, the reliability of operation of the overall system may be improved without interrupting service.

DETAILED DESCRIPTION OF THE SWITCHOVER LOGIC

Figure 2:
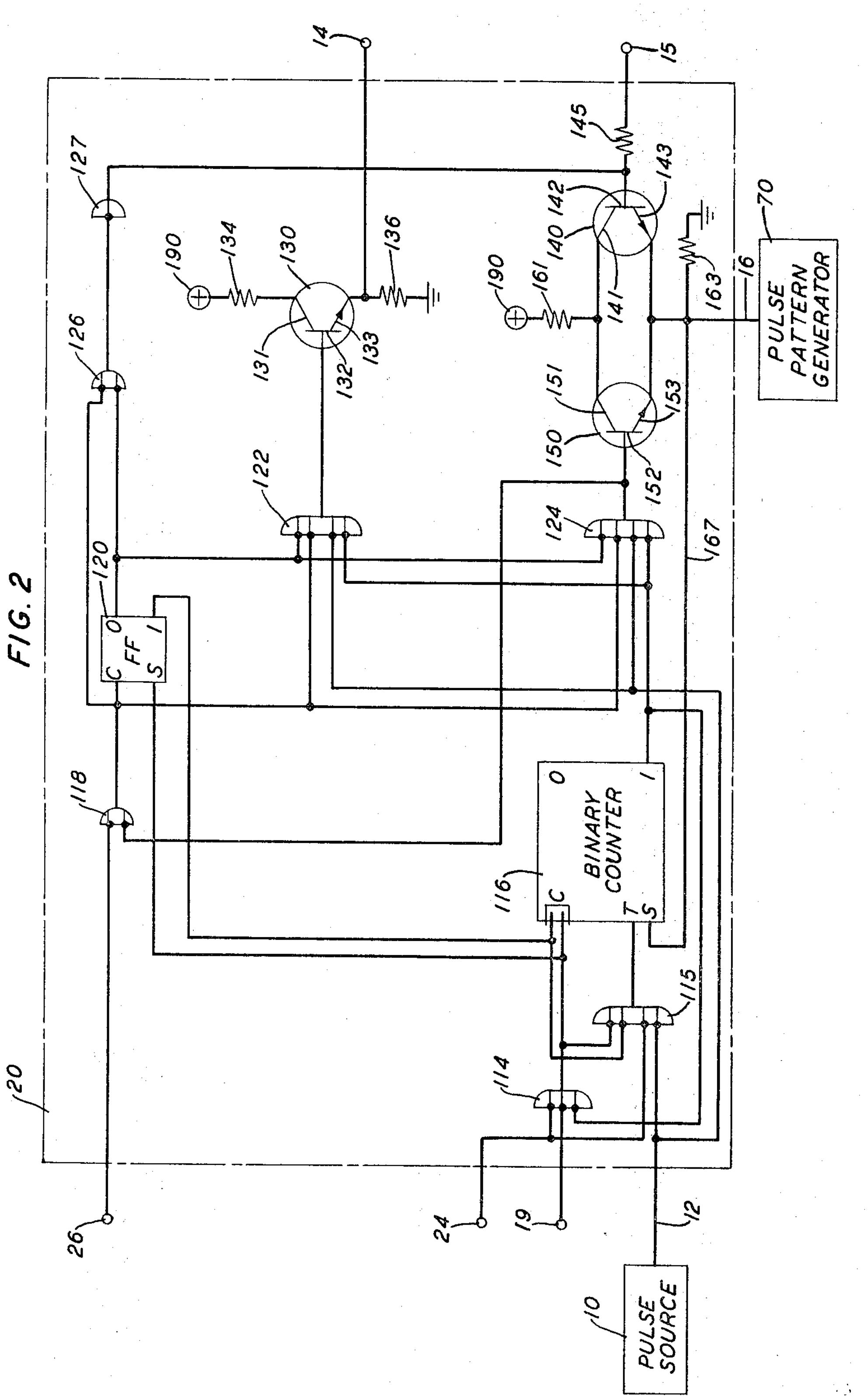
FIG. 2 is a detailed schematic diagram of an illustrative embodiment of the switchover logic circuit.

FIG. 2 shows switchover logic 20 of the embodiment of this invention in accordance with FIG. 1. The logic devices in FIG. 2 each operate in one of two states. Digital signals applied to or obtained from these devices may either be at a relatively high voltage level corresponding to a first state, or, alternatively, at a relatively low voltage level corresponding to the second state. The relatively high voltage level is hereinafter referred to as "positive" and the relatively low voltage level is hereinafter referred to as "ground." It is to be understood that any suitable combination of two voltage levels compatible with logic devices known in the art may be used.

Gates 114, 115, 118, 122, 124, 126, and 127 of FIG. 2 are NOR (not OR) gates well known in the art which perform a NOR or a NAND (not AND) function depending on the voltage levels of the input signals applied thereto. If all the inputs to one of these gates, e.g., 114, are at ground, no current flows through the gate output and the output signal obtained therefrom is positive. If, however, any one of the inputs is positive, current does flow though the gate output and the output voltages in response thereto is ground.

Binary counter 116 and flip-flop 120 of FIG. 2 provide bistable storage means responsive to signals applied to their inputs as is well known in the art. Flip-flop 120 has a clear input C and a set input S and a "0" and a "1" output. A positive signal applied to the clear input switches the flip-flop to the "0" state in which a positive signal is obtained from the "0" output and a ground signal is obtained from the "1" output. A positive signal applied to the set input S of flip-flop 120 results in a positive signal at the "1" output and a ground signal at the "0" output. Binary counter 116 has a clear input C, a toggle input T, and a set input S, and a "0" and a "1" output. Its operation is identical to that of flip-flop 120 except that, in addition, a negative transition of voltage at the toggle input, occurring when gate 115 is switched from positive to ground voltage levels, reverse the state of the binary counter. If the binary counter is in the "1" state, a negative transition corresponding to the leading edge of the positive portion of the signal from source 10 is applied to the toggle input which switches it to the "0" state. Alternatively, if the binary counter is in the "0" state, a negative transition at the toggle input switches it to the "1" state.

The switchover logic of FIG. 2 operates in the following manner. First, it should be noted that the pulse train from pulse source 11 is shown in waveform 310 of FIG. 3 and the pulse train from source 10 is shown in wavefrom 315 of FIG. 3. These pulse trains are out of phase. For the purposes of description, it is assumed that pulse source 11 is "on line" and that pulse source 10 is to be switched "on line." Under the aforementioned assumption, prior to the application of the switchover command signals from switchover control 81, pulses from pulse source 11 are applied via lead 15 to base 142 of transistor 140. This transistor is connected in parallel with transistor 150. The circuit arrangement involving transistors 140 and 150, as is well known in the art, performs an "OR" function, i.e., signals from either lead 15 or from gate 124 are permitted to pass through the emitter-base path of transistor 140 or 150 to lead 167.

A current path is established from positive voltage source 190 through resistor 161, the collector-emitter paths of either transistor 140 or 150, and resistor 163 to ground. A positive voltage at lead 15 or at the output of gate 124 causes substantially the same positive voltage to appear on lead 167. Thus, if a pulse train is applied to lead 15 from pulse source 11 via switchover logic 21, substantially the same pulse train appears on lead 167. The pulse train is applied to pulse pattern generator 70 via lead 16 and through lead 167 to the set input of binary counter 116. This arrangement insures that generator 70 operates simultaneously and in synchronism with generator 71 to which pulses from source 11 are also applied.

Pulses from source 10 via lead 12 are applied to both gates 122 and 124. In the absence of an inhibition (i.e., a positive-going signal) on these gates, the negative-going pulses from source 10 are applied to pulse pattern generator 70 via transistor 150 and lead 116. Negative-going pulses are also applied to lead 14 through transistor 130 which operates in the same manner as transistors 140 and 150. This occurs only if source 10 is "on line." But gates 122 and 124 are inhibited by binary counter 116, the "0" output of flip-flop 120, and the output of gate 118. This is true because pulse source 11 is "on line." When the switchover is completed and source 10 is "on line," all these inhibiting signals are removed. Prior to switchover, binary counter 116 is unconditionally placed in the "1" state as a result of the hereinbefore mentioned positive pulses (waveform 345) from lead 167. The "1" output of binary counter 116 is then positive and in this state counter 116 inhibits gates 122 and 124.

Prior to switchover from source 11 to source 10, the voltage on lead 26 is ground and the voltage on lead 24 is positive. The output of gate 124 is at ground when pulse source 11 is active. This is so because the counter 116, flip-flop 120, and gate 118 apply inhibiting positive signals to gate 124. The input signals on gate 118 comprising signals from lead 26 and gate 124 are at ground and a positive output signal is obtained from this gate. This positive signal inhibits gates 122 and 124 and also insures that flip-flop 120 is in the "0" state. The output signals from gates 122 and 124 are substantially identical and are shown on waveform 365 of FIG. 3. The "0" output of flip-flop 120 is then positive and also inhibits gates 122 and 124. By using gate 118 to inhibit gates 122 and 124, these latter gates are inhibited during the time interval in which flip-flop 120 is being switched to the "0" state.

Gate 127 is connected between gate 126 and base 142 of transistor 140. It provides a ground signal which prevents pulses from source 11 from being applied to switchover network 20 when source 10 is "on line." But, if source 10 is "off line," as in the present case, the positive signal from either gate 118 or the"0" output of flip-flop 120 causes the output of gate 126 to be ground so that no current flows into the output lead of gate 127 and gate 127 does not affect the voltage at lead 15. This arrangement allows pulses appearing on lead 15 from "on line" source 11 to be applied to switchover logic 20. Resistor 145 decouples the output of gate 127 from lead 15. At the beginning of the first complete pulse sequence cycle after switchover has been initiated, the signal on lead 26 becomes positive and the signal on lead 24 becomes ground. This occurs at $t_0$ in waveforms 325 and 330 of FIG. 3. Waveform 325 is applied to lead 24 and waveform 330 is applied to lead 26. Since gate 118 has at least one positive input at this time, its output is at ground and the inhibition therefrom on gates 122 and 124 is removed. The positive input to the clear terminal of flip-flop 120 from gate 118 is also removed so that flip-flop 120 may be set later in the same cycle by a positive signal from gate 114.

Figure 3:
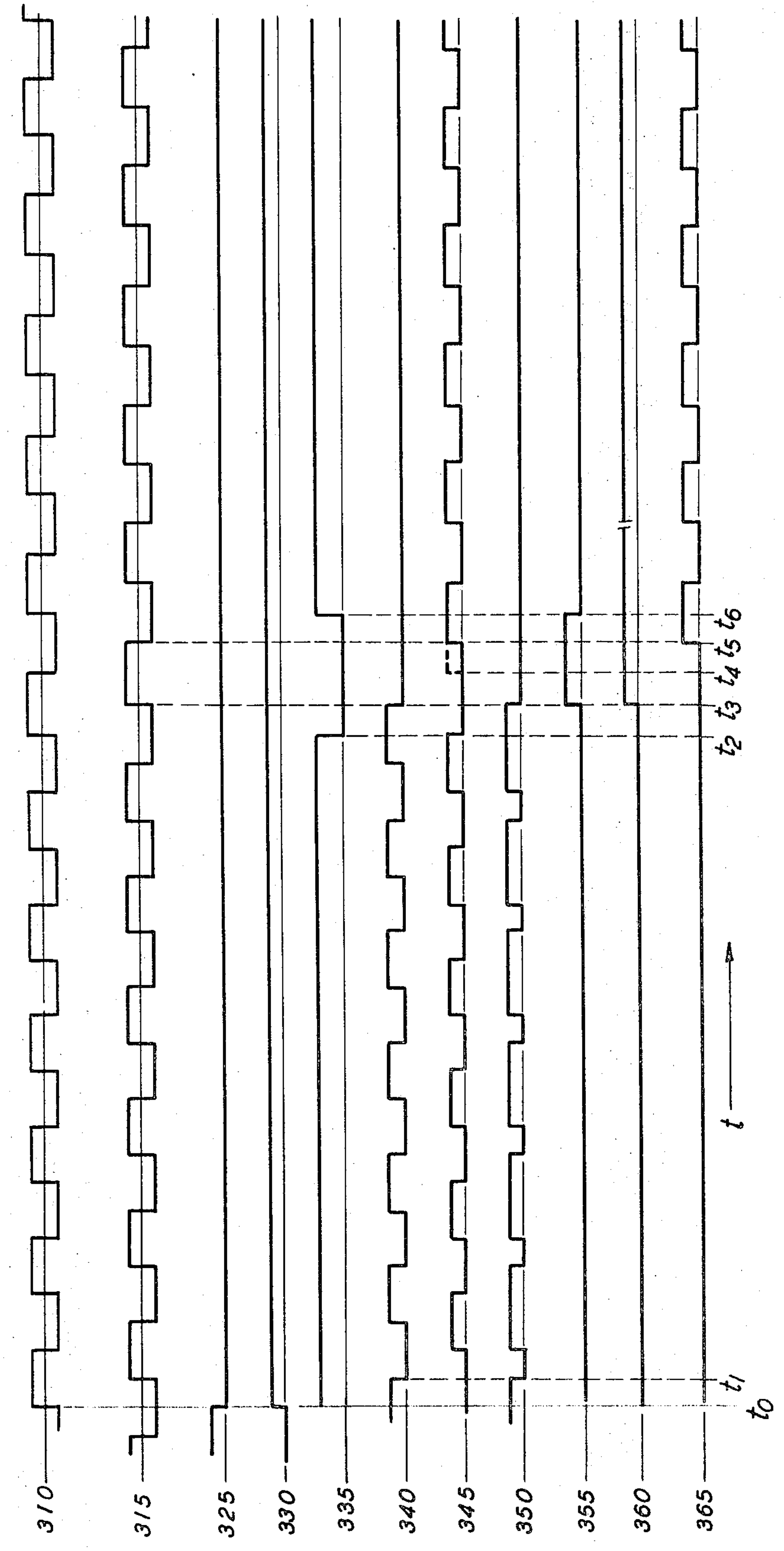
FIG. 3 illustrates the waveforms associated with the schematic diagram of FIG. 2.

The pulse train from source 10 is applied via lead 12 to gate 115 as well as to gates 122 and 124. The signal from switchover control 81 via lead 24, the signal from the set output of flip-flop 120, and the output signal from gate 114 are also applied to gate 115. The signal on lead 24 is at ground after $t_0$, of the switchover cycle. The signal from the "1" output of flip-flop 120 is also at ground at $t_0$ since flip-flop 120 remains in the "0" state until the switchover takes place later in this cycle. The output of gate 114 is at ground because the signal on lead 19 is positive until waveform 430 of FIG. 4 goes to ground. This waveform goes to ground only during the last pulse of the pulse pattern from generator 71 or 72. The signal on lead 19 is waveform 335 of FIG. 3. Thus, at the beginning of the first cycle after the switchover command has been given, the output of gate 115 is an inverted signal corresponding to the pulse train from source 10. This inverted signal, waveform 340 of FIG. 3, is applied to the toggle input of binary counter 116. The output of gate 115 switches binary counter 116 to the "0" state each time there is a negative transition in the signal from gate 115 and waveform 345, which is applied to the set input of binary counter 116 via lead 167, is at ground. Waveform 350 shows the output signal at the "1" output of counter 116.

At $t_0$ of switchover cycle, binary counter 116 has already been set by a previous positive pulse from source 11 via lead 167. Waveform 345, the pulse train on lead 167 is then ground or below ground at the time the output signal from gate 115 goes to or below ground. This negative transition in the leading edge of the signal at gate 115 occurs at $t_1$ on FIG. 3. In response to this negative-going transition from gate 115 (waveform 340), binary counter 116 switches to the "0" state, the "1" output goes to ground and the inhibition from the "1" output of counter 116 on gates 122 and 124 is removed. But the pulses from source 10 do not pass through gates 122 and 124 because the inhibition from the "0" output of flip-flop 120 remains. The next positive signal from source 11 switches binary counter 116 to the "1" state and the inhibition on gates 122 and 124 therefrom is reapplied. The foregoing sequence is repeated until the last pulse (waveform 430) of the switchover cycle so that the switching of binary counter 116 is not effective to pass pulses from source 10 through gates 122 and 124 until the signal on lead 19 (waveform 335) goes to ground at $t_2$ to allow gate 114 to set flip-flop 120.

FIG. 4 shows the multiphase pulse pattern appearing on the leads of cables 82 and 83 from generators 70 and 71. While not essential to this invention, it is desirable that switchover between pulse sources 10 and 11 take place during the last pulse of the cycle (waveform 430) when the signals appearing on leads 84 and 85 are at ground. This permits checking of generators 70 and 71 just prior to a new cycle which checking improves the reliability of the clock arrangement. It also allows switchover to be accomplished at very high clock rates where the speed limitations of available logic devices necessitate a time delay greater than the pulse period at the pulse source between the command from switchover control 81 and the actual switchover between pulse sources. It is to be understood that this clocking arrangement is given by way of example only and that other arrangements may be devised in which switchover occurs at different times in the clock cycle.

In accordance with this embodiment, a ground signal is applied to gate 114 from lead 19 which sets flip-flop 120 to the "1" state when binary counter 116 is reset during the last pulse of the switchover cycle. If generators 70 and 71 comprise shift registers, the signal on lead 19 (waveform 335) may be the pulse that resets these shift registers to a state corresponding to the start of a new pulse sequence.

Gate 114 receives input signals from lead 24, lead 19, and the "1" output from binary counter 116. The signal on lead 24, from the switchover control as hereinbefore mentioned, is at ground during the switchover cycle. The signal on the "1" output of binary counter 116 alternates between a positive potential and ground in accordance with waveform 350. Thus, when waveform 335 on lead 19 is at ground after $t_2$ and the "1" output of binary counter 116 (waveform 350) is thereafter put at ground, the output of gate 114 becomes positive and sets flip-flop 120. This happens during the last generator pulse of the cycle (waveform 430), after a positive transition from soure 10 occurs and a negative transition responsive thereto from gate 115 is applied to the toggle input of binary counter 116.

At this time, $t_3$, all inhibitions on gates 122 and 124 are removed because flip-flop 120 has been switched to the "1" state, and the "0" output thereof goes to ground. But this occurs only during the positive portion of the pulse on waveform 315 from pulse source 10 between times $t_3$ and $t_5$ on FIG. 3 so that gates 122 and 124 are inhibited for at least that positive portion of the pulse from source 10. If the signal on lead 19 (waveform 335) did not go to ground, waveform 345 would go positive $t_4$. As a result of the switchover logic circuit operation, however, the interval between the application of pulses from source 11 and source 10 is extended as shown between $t_4$ and $t_5$ on waveform 345 of FIG. 3. Waveform 345 is the signal on leads 16 and 167. This interval corresponds to the phase difference between the pulse trains from sources 11 and 10.

During the previously mentioned positive pulse portion, the positive signal from the "1" output of flip-flop 120 is applied to gate 115 to prevent further pulses from source 10 to pass therethrough. In this manner further negative transitions are prevented from being applied to the toggle input of binary counter 116. The positive signal from the "1" output of flip-flop 120, waveform 360, is applied to the clear input of binary counter 116 to insure that binary counter 116 remains in the "0" state when source 10 is "on line." The output from gate 114, waveform 355, is also applied to the clear input of binary counter 116 to activate the clear input thereof while flip-flop 120 is being switched from the "0" to the "1" state. When the signal on lead 19 (waveform 335) becomes positive at $t_6$, the output of gate 114 returns to ground.

After flip-flop 120 is switched to the "0" state, gate 126 produces a positive signal which switches the output of gate 127 to ground so that transistor 140 is inhibited. This occurs because the "0" output of flip-flop 120 and the output of gate 118 are both at ground. Any positive-going pulses that may appear thereafter on lead 15 from source 11 are thereby excluded from switchover logic 20. Independent of the inhibition of transistor 140, the switchover command is applied to inhibit the gates in switchover logic 21 corresponding to gates 122 and 124. This inhibition is accomplished by switching the flip-flop of switchover logic 21 corresponding to flip-flop 120 to the "0" state during the last pulse of the switchover cycle.

While the phase relationship shown between waveform 310 from source 11 and waveform 315 from source 10 is such that binary counter 116 switches between the "0" and the "1" state prior to waveform 335 going to ground, waveform 315 may go positive while waveform 310 is negative. In this case, the negative transition on the output of gate 115 is applied to the toggle input of counter 116 while the positive pulse from lead 167 is applied to its set input so that counter 116 does not alternate in the aforementioned manner. But, when the pulses applied to the set iput of counter 116 from lead 167 are inhibited at $t_2$ and waveform 335 on lead 19 is at ground, counter 116 is switched so that the "1" output of counter 116 is at ground as hereinbefore described.

After the switchover is completed, the negative-going pulses from source 10 pass through gate 124 and are applied to generator 70 through transistor 150 and lead 16. No pulse appears on lead 15 since switchover logic 21 has inhibited the pulse train from source 11 and gate 122 passes pulses from source 10 to generator 71 through switchover logic 21 and lead 17. Utilization device 72 is now "on line" and utilization device 73 is "off line" operating in parallel with utilization device 72.

It is to be understood that the hereinbefore described arrangement is only an illustrative embodiment of the principles of this invention. Numerous other arrangements may be devised by those skilled in the art without departing from the spirit and scope of this invention.

What is claimed is:

1. A circuit for coupling signals from one of first and second repetitive signal sources to a means for generating pulses responsive to the trailing portion of said signals from one of said first and second signal sources comprising first mean operative in a first state for permitting the coupling of signals only from said first signal source to said generating means and operative in a secod state for permitting coupling of signals only from said second signal source to said generating means, second means connected between said first signal source and said first means responsive to receipt of signals from said first signal source for switching said first means to said first state, and third means connected between said second source and said first means responsive to the leading portion of the first signal from said second source in the absence of signals from said first source for switching said first means to said second state.

2. A circuit having independently operating first and second repetitive signal sources, means responsive to the receipt of signals from one of said first and second sources for generating pulse sequences, and logic means for preventing the pulse rate of said pulse generating means from exceeding the pulse rate of said second source upon switching from said first to said second source comprising control means having first and second states for inhibiting the passage of signals from said second source to said pulse generating means in said first state and for permitting the passage of the trailing portion of each signal from said second source to said pulse generating means in said second state, means for switching said control means to said first state responsive to receipt of said signals from said first source, means for inhibiting the passage of said first source signals to said control means, and means responsive only the receipt of the leading portion of the first signal from said second source in the absence of said first source signals for switching said control means to said second state.

3. A circuit in accordance with claim 2 wherein said first and second signal sources operate independently at the same frequency and wherein said logic means further comprises means for permitting switching from said first source to said second source only at the end of said pulse sequence.

4. A circuit in accordance with claim 2 wherein said control means comprises a binary counter having set and toggle inputs, said means for switching said control means to said first state comprises means connected between said first source and said set input and said means for switching said control means to said second state comprises means connected between said second source and said toggle input for applying only the leading portion of said first signal from said second source in the absence of said first source signals to said toggle input, said toggle input being responsive to the leading edge of said leading portion.

5. In a clock circuit having first and second sources operating independently at the same repetition rate, and means responsive to waves from one of said first and second sources for generatnig repetitive pulse patterns, switchover means for inhibiting the applicatiton of said first source waves to said generating means and for applying the trailing portion of said second source waves to said generating means at least one-half period of said waves after the inhibition of said first source waves, said switchover means comprising first means operative in a set state to inhibit the passage of the trailing portion of said second source waves to said generating means and operative in a reset state to permit passage of the trailing portion of said second source waves to said generating means, second means for switching said first means to said set state responsive to receipt of said first source waves at said first means and third means connected between said second source and said first means for switching said first means to the reset state comprising means for inhibiting the application of said first source waves to said first means and means responsive to receipt of the leading portion of the first wave from said second source at said first means in the absence of said first source waves for switching said first means to said reset state.

6. In a clock circuit having first and second sources operating independently at the same frequency and means responsive to waves from one of said first and second sources for generating repetitive pulse patterns, switchover means for inhibiting the application of said first source waves to said generating means and for delaying the application of said second source waves to said generating means for at least one-half cycle of said frequency after the inhibition of said first source waves, said switchover means comprising control means having first and second states for inhibiting the passage of said second source waves to said generating means in said first state and for permitting the passage of the trailing portion of said second source waves to said generating means in said second state, means responsive to receipt of said first source waves for switching said control means to said first state, means for inhibiting the passage of said first source waves to said control means, and means connected between said second source and said control means for switching said control means to said second state responsive to receipt of the transition preceding the leading portion of the first wave from said second source in the absence of said first source waves at said control means.

7. In a clock circuit, the combination according to claim 6 wherein each of said pulse patterns comprises a plurality of pulses and said switchover means further comprises means responsive to receipt of the last pulse of said pulse pattern derived from said first source waves for permitting switching of said control means to said second state only during said last pulse.

8. In a clock circuit, the combinatiton according to claim 7 wherein said control means comprises a binary counter having set, reset and toggle inputs, said means for switching said control means to said first state comprises means connected between said first source and said set input, said means for switching said control means to said second state comprises gating means for applying said second source waves to said toggle input, means connected between said control means and said gating means responsive to said control means being switched to said second state during said last pulse for inhibiting said gating means from applying said second source waves to said toggle input and flip-flop means connected to said reset input and responsive to said means for inhibiting said gating means for maintaining said inhibition on said gating means and for maintaining said control means in said second state.

9. A circuit comprising identical first and second repetitive signal sources operating asynchronously at the same frequency, pulse generating means responsive to receipt of signals from one of said first and second signal sources, and switching means for applying signals from said second source to said pulse generating means at least one-half period of said frequency after inhibititon of said signals from said first signal source, said switching means comprising first means operative in a first state to inhibit the passage of negative signals from said second source to said pulse generating means and operative in a second state to allow the passage of negative signals from said second source to said pulse generating means, means responsive to positive signals from said first source for switching said first means to said first state, means for inhibiting the application of said first source positive signals to said first means, and means responsive to the first positive signal from said second source after the inhibition of said positive signals from said first source for switching said first means to said second state.

10. A circuit comprising first and second repetitive pulse sources operating asynchronously at the same reptition rate, pulse sequence generating means responsive to receipt of the negative-going portion of pulses from one of said first and second pulse sources, and means for switching said pulse sequence generating means from said first to said second pulse source comprising first means including a binary counter, said first means being operative in a first state to inhibit the passage of said second source pulses to said generating means and operative in a second state to permit the passage of said second source pulses to said generating means, characterized in that means responsive to said first source pulses switch said first means to said first state and mean responsive to the leading edge of the first positive-going pulse from said second source in the absence of said first source pulses switch said first means to said second state.

References Cited

UNITED STATES PATENTS 2,906,869 9/1959 Kramskoy ---------- 328—154
3,034,065 5/1962 Coleman ---------- 328—154

JOHN S. HEYMAN, Primary Examiner

H. A. DIXON, Assistant Examiner

U.S. Cl. X.R.

307—269